(12) United States Patent
Lumbis et al.

(10) Patent No.: US 6,283,765 B1
(45) Date of Patent: Sep. 4, 2001

(54) INTEGRATED I.D. MODULE AND TERMINAL BLOCK FOR ECP BRAKE APPLICATION (NY-1084)

(75) Inventors: Anthony W. Lumbis, Watertown; Laura J. Nabywaniec, Calcium, both of NY (US)

(73) Assignee: New York Air Brake, Watertown, NY (US)

( * ) Notice: Subject to any disclaimer, the term of this patent is extended or adjusted under 35 U.S.C. 154(b) by 0 days.

(21) Appl. No.: 09/610,680

(22) Filed: Jul. 7, 2000

(51) Int. Cl.[7] .................................................. H01R 33/00
(52) U.S. Cl. ................................................................ 439/35
(58) Field of Search .............................. 439/76.1, 34, 35, 439/104, 346, 709; 174/59

(56) References Cited

U.S. PATENT DOCUMENTS

| | | | |
|---|---|---|---|
| 625,828 | * | 5/1899 | Case ........................................ 439/35 |
| 3,523,268 | * | 8/1970 | Foster . |
| 4,017,136 | * | 4/1977 | Sasgen ................................. 439/503 |
| 4,041,470 | | 8/1977 | Slane et al. . |
| 4,072,377 | * | 2/1978 | Van de Loo et al. ............... 439/76.1 |
| 4,689,602 | | 8/1987 | Morihara et al. . |
| 4,702,291 | | 10/1987 | Engle . |
| 4,825,189 | | 4/1989 | Honma et al. . |
| 5,168,273 | | 12/1992 | Solomon . |
| 5,651,517 | | 7/1997 | Stevens et al. . |
| 5,777,547 | | 7/1998 | Waldrop . |
| 5,815,823 | | 9/1998 | Engle . |
| 5,967,465 | * | 10/1999 | Lumbis et al. ........................ 246/187 |
| 5,986,577 | | 11/1999 | Bezos . |
| 6,012,681 | * | 1/2000 | Lumbis et al. ........................ 246/187 |
| 6,049,296 | | 4/2000 | Lumbis et al. . |

FOREIGN PATENT DOCUMENTS 2100770    7/1972   (DE) .

* cited by examiner

*Primary Examiner*—Brian Sircus
*Assistant Examiner*—Michael C. Zarroli
(74) *Attorney, Agent, or Firm*—Barnes & Thornburg

(57) ABSTRACT

An ID module and terminal block for use in a train that includes at least one locomotive and a plurality of cars, each car being serially connected into a network by a power and communication trainline to an adjacent car. Each car is equipped with a local communication node connected to a car control device and to the network. A common housing, preferably made of a non-conductive material, encloses a circuit module and includes a second communication node and a current sensor. A terminal block is formed on the housing, and a plurality of stud terminals extend through apertures in the terminal block to electrically contact a circuit board, which is part of the circuit module. The novel arrangement of electronics and terminals and a connector cap allows one to perform tests of the power and communication trainline without having to mechanically disconnect the car communication device or the circuit module; rather, the connector caps electrically are configured to allow electrical isolation of the circuit board from the power and communication trainline. Additionally, the system includes a mating plug enabling disconnection of the car control device from the power and communication trainline without disturbing the leads connected to the terminal block.

30 Claims, 6 Drawing Sheets

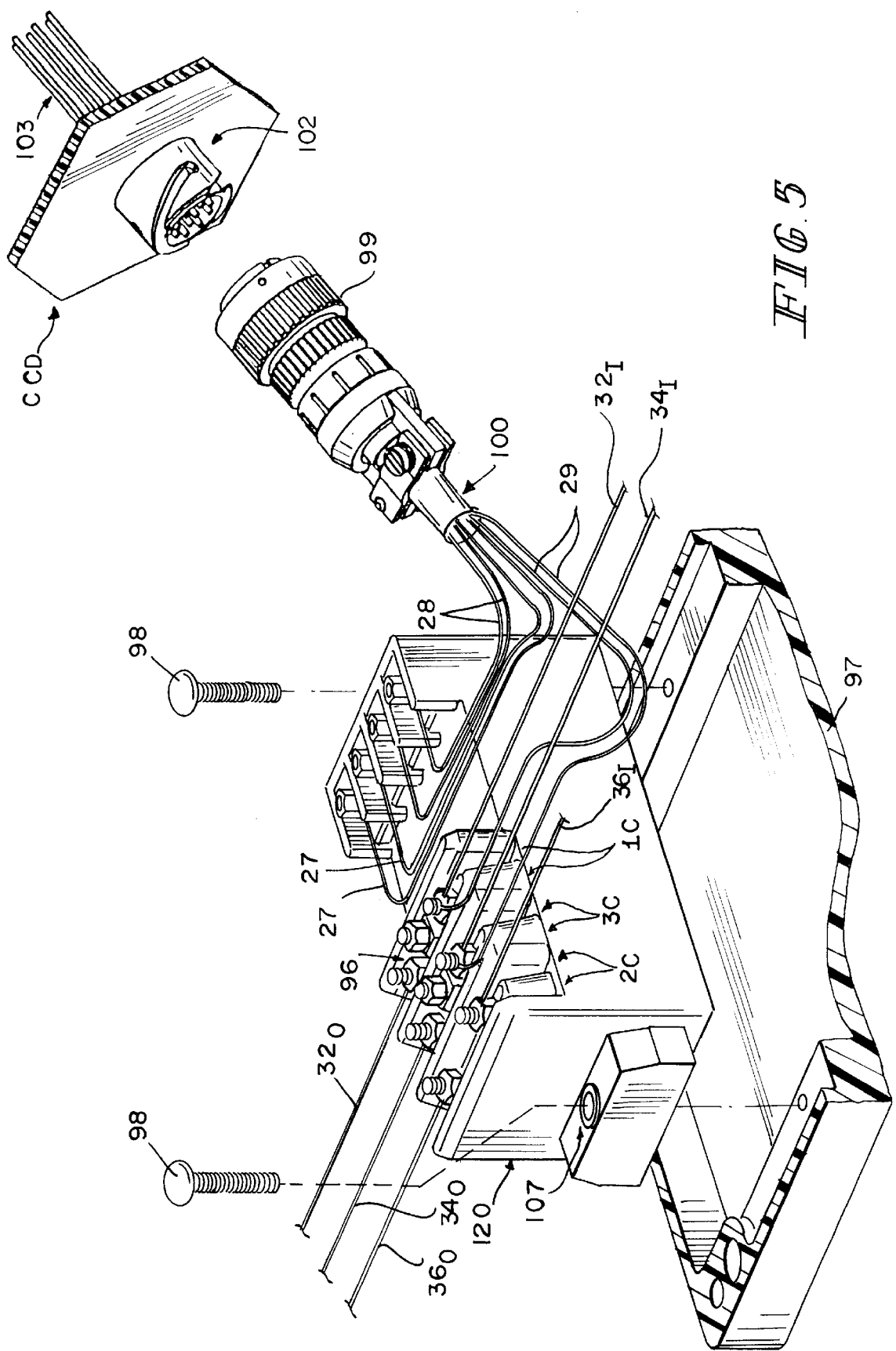

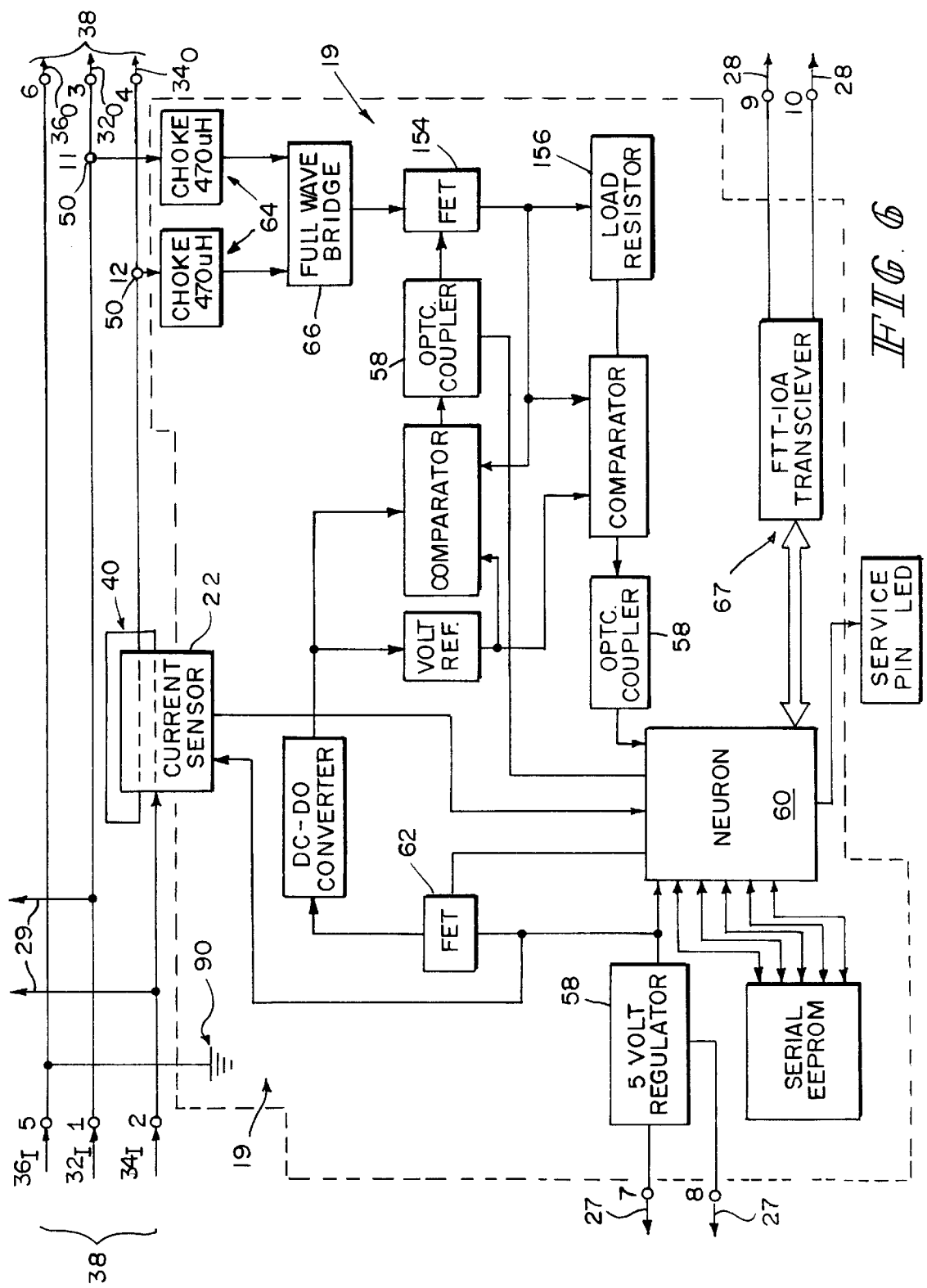

INTEGRATED I.D. MODULE AND TERMINAL BLOCK FOR ECP BRAKE APPLICATION (NY-1084)

BACKGROUND AND SUMMARY OF THE INVENTION

The present invention relates generally to the automatic identification of rail cars, and more specifically to an integrated identification module and terminal block for rail cars equipped with electro-pneumatic brakes.

With the addition of electro-pneumatically operated train brakes to railway freight cars, comes a need to be able to automatically identify the types, weights and braking ratios of the individual cars in the train. Present systems address this by requiring that serial numbers of the cars as well as other related information be entered into a data file in the locomotive controller. This method does provide the information necessary to properly identify each car in the train; however, it is very time consuming when dealing with long trains (for example, one hundred cars or more), and must be manually updated every time a train adds or drops off cars or locomotives. Moreover, manually entering the data increases the opportunity for error.

A system for automatic identification of railcars is disclosed in U.S. Pat. No. 5,967,465 to Lumbis, et al. Lumbis '465 discloses an automatic identification of EP braked equipped railcars having a storage device or ID module permanently mounted on the car, including the car identification data. The prior art ID module is connected to the local communication node, which communicates with the locomotive and a network for reading the identification data stored in the storage device. The local communication node then communicates the identification data to a controller at the locomotive. Preferably, the ID module is a subsidiary communication node controlled by the local communication node and activated by the local communication node when it requires information. Lumbis also shows a terminal block for connecting the local node and current sensor separate from the ID module, and interconnected by wires.

The presently configured integrated identification module for ECP brake applications improves upon the prior art as disclosed in '465 by integrating the wires, terminal block, and ID module into a common housing.

The novel arrangement of the terminals, housing, and a circuit module comprising sensors, wires, and a circuit board simplifies the electric connection, and further provides a more durable, solid-state arrangement that reduces the risk of failure. Additionally, the arrangement simplifies the process of testing the brake and communication systems by allowing an operator to electrically isolate the electronics and/or the car control device without physically removing leads from the terminals.

The present ID module is for use in a train that includes at least one locomotive and a plurality of cars, each car being serially connected into a network by a power and communication trainline to an adjacent car. Each car is equipped with a local communication node connected to a car control device and to the network.

The invention comprises a common housing, preferably made of a nonconductive material. A circuit module is enclosed within the housing and includes a second communication node and a current sensor. A terminal block is formed on the housing, and a plurality of stud terminals extend through apertures in the terminal block such that a first end of each stud terminal is outside the housing and a second end of each stud terminal is inside the housing. Selected stud terminals contact the circuit module at their respective second ends.

At least two input leads comprising an input from a power and communication trainline are connected to the first end of selected stud terminals such that each input lead from the trainline is connected to its own stud terminal. An equal number of electrical output leads comprising an output of the power and communication trainline are connected to the first ends of another set of selected stud terminals such that each output electrical lead to the trainline extends from the first end of its own stud terminal.

A jumper wire in the circuit module passes through the current sensor and interconnects the second ends of a selected input power and communication trainline lead to a selected power and communication trainline output lead.

A shield input from the power and communication trainline is connected to the first end of a distinct, selected terminal; a shield output from the power and communication trainline is connected to the first end of another distinct stud terminal. These two selected shield terminals are connected at their first ends by a conductive strip. Preferably, the second end of at least one of these shield terminals is connected to the ground of the circuit module.

The power and communication trainline preferably comprises two power carrying lines and at least one shield line. Thus, a total of at least three input terminals is needed. As mentioned earlier, one set of power and input communication trainline terminals are electrically connected by a jumper wire extending inside the housing. The other pair of stud terminals is connected at the first ends by a conductive strip. In order to make this discourse easier to follow, the terminals will be given numbers. The first pair of terminals, which connect the input and output leads from one line of the power and communication trainline, shall be labeled the first and second terminals. The second pair of terminals, which are connected at their second ends by the jumper wire, and which connect input and output leads from a second line from the power and communication trainline, will be called the third and fourth terminals. In like manner, the terminals receiving the shield input and output will be called the fifth and sixth terminals, respectively The terminal block further includes seventh, eighth, ninth, and tenth stud terminals. The seventh and eighth terminals have second ends connected to supply input ports of the circuit module. Leads connect the first ends of the seventh and eighth stud terminals to supply output ports of the car control device. The ninth and tenth stud terminals are connected inside the housing by their second ends to communication ports of the circuit module. Leads connect the first ends of the ninth and tenth stud terminals to the communication ports of the car control device.

The housing includes eleventh and twelfth stud terminals, each connected at their second ends in series with a load and a switch. The first ends of the eleventh and twelfth stud terminals are connected to the first ends of one of the first and second stud terminals, and one of the third and fourth stud terminals, respectively; and the second communication node controls the switch.

The terminal block has first, second and third channels wherein the apertures for the terminals are formed in each of the channels. The first ends of first, second, and eleventh terminals are spaced apart in the first channel. A first conductive strip lies in the first channel to electrically connect the first ends of the first, second and eleventh termninals.

The first ends of the fifth and sixth terminals are spaced apart in the second channel; a second conductive strip lies in the second channel to electrically connect the first ends of the fifth and sixth terminals.

The first ends of the third, twelfth, and fourth terminals are spaced apart in the third channel. A third conductive strip lies in the channel to electrically connect the first ends of the third and twelfth terminals. A dividing structure lies in the third channel between the twelfth and fourth terminals in order to prevent the third conductive strip from creating electrical contact between the first ends of the fourth and twelfth terminals.

The car control device must also be in electric communication with the power and communication trainline. In that regard, at least two leads connect power and communication trainline ports of the car control device to the first end of one of the first and second stud terminals and one of the third and fourth stud terminals, respectively.

The circuit module includes electronics mounted to a circuit board, which is displaced from the housing and mounted to the second ends of a plurality of the stud terminals. A space is thereby formed between the circuit board and the housing. Preferably, the space between the circuit board and the housing and the circuit board is potted. The current sensor is mounted to the circuit board and is potted.

Each of the terminals may be threaded to receive a cap. The cap on each of the eleventh and twelfth terminals, however, is a specially designed electrically-conducting connector cap. Each electrically-conducting connector cap has an engaging section that threadedly engages a portion of the first end of each of the eleventh and twelfth terminals, and an extending section extending from the engaging section toward the conducting strip. The connector cap on the eleventh terminal is threadedly adjustable between a connected position, wherein the extending contacts the first conducting strip, and a disconnected position wherein the extending section does not contact the first conducting strip. Likewise, the connector cap on the twelfth terminal is threadedly adjustable between a connected position wherein the extending section contacts the third conducting strip, and a disconnected position wherein the extending section does not contact the first conducting strip. This structure allows electrical isolation without physical disconnection of the trainline leads.

Preferably, the second ends of terminals five through ten are electrically affixed to the circuit board. This attachment may be accomplished either by electrically conductive bolts or by soldering. In contrast, the second ends of terminals eleven and twelve are electrically connected to the circuit board by an electrical lead extending from the circuit board to the second end of the respective terminal. Moreover, the second ends of terminals one through four do not make electrical contact with the circuit board.

There are two distinct embodiments for attachment of the jumper wire to the second end of the second and fourth terminals. In a first embodiment, terminals one through four are bolted to the circuit board. The jumper wire is electrically connected to the second ends of termninals two and four by bolts which create mechanical but not electrical contact with the circuit board. The jumper wire passes through the current sensor between the two bolted ends.

In a second embodiment, the second ends of terminals two and four extend through apertures in the circuit board. Bolts engage an internally threaded portion of the second end of each of the second and fourth terminals to attach jumper wire. The apertures in the circuit module are formed significantly large to prevent contact between the terminals and the circuit board. Any open space inside the housing is preferably filled by potting.

The second embodiment is preferred because the ID module may be exposed to extreme heat and cold as the train travels through various climates. Consequently, the materials will naturally expand and contract. In order to prevent material failure due to the strains and stresses of expansion, the apertures allow the board to expand or contract more freely.

The housing is preferably bolted to a junction box.

All told, three pair of leads extend from the terminals to the car control device. These leads are formed into a single cable that terminates with a six-prong, military style plug. The plug connects to a female plugs that leads to the car control device. Thus, the car control device may be disconnected from the power and communication trainline by removing the connection between these mating plugs Other objects, advantages and novel features of the present invention will become apparent from the following detailed description of the invention when considered in conjunction with the accompanying drawings.

BRIEF DESCRIPTION OF THE DRAWINGS

FIG. 5 is a perspective drawing of the integrated module bolted to a junction box.

FIG. 6 is an electrical diagram of the circuitry.

DETAILED DESCRIPTION OF THE PREFERRED EMBODIMENTS

Figure 1:
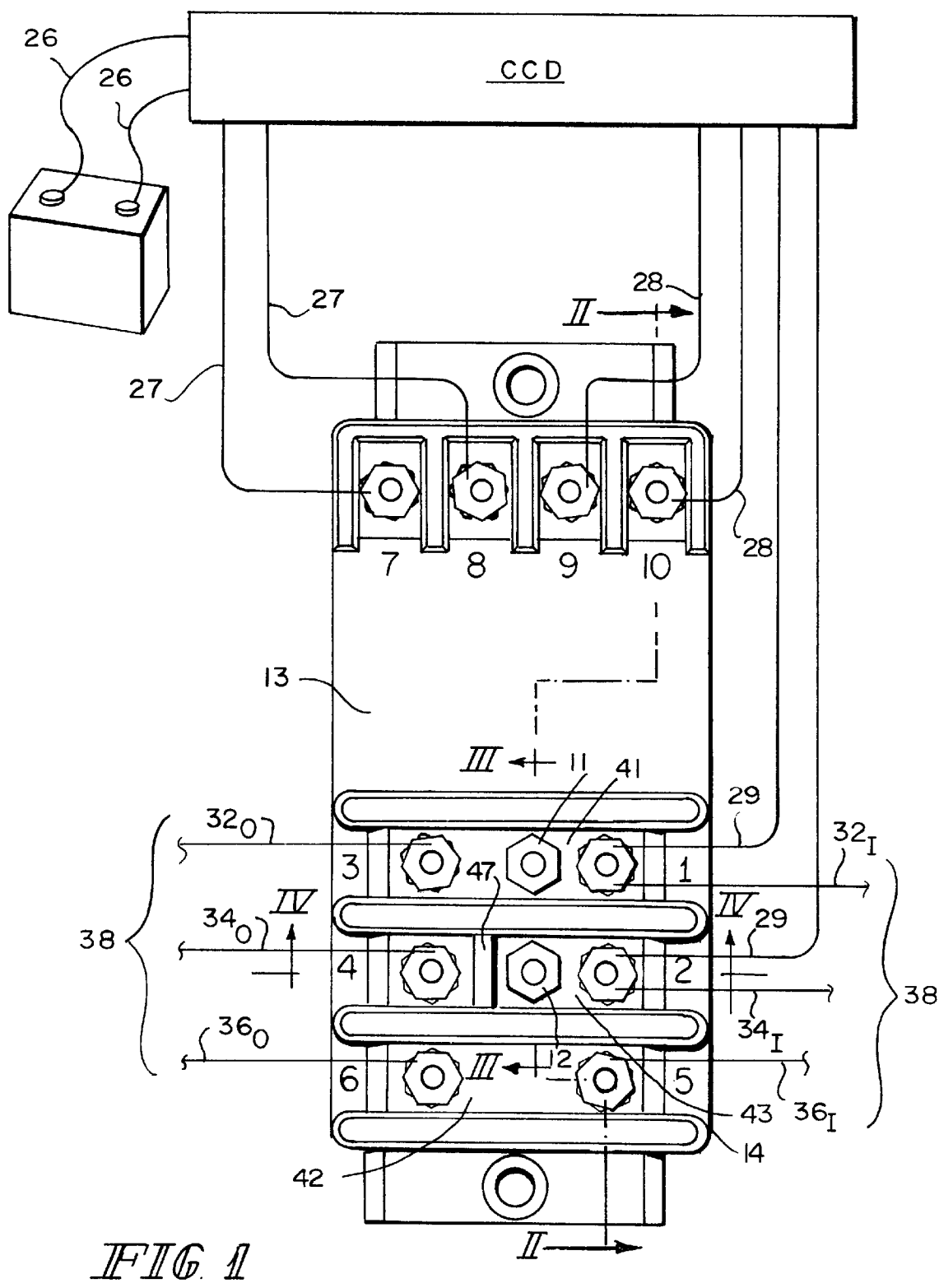
FIG. 1 is a plan view of an integrated module and terminal block incorporating the principles of the present invention.
Figure 2:
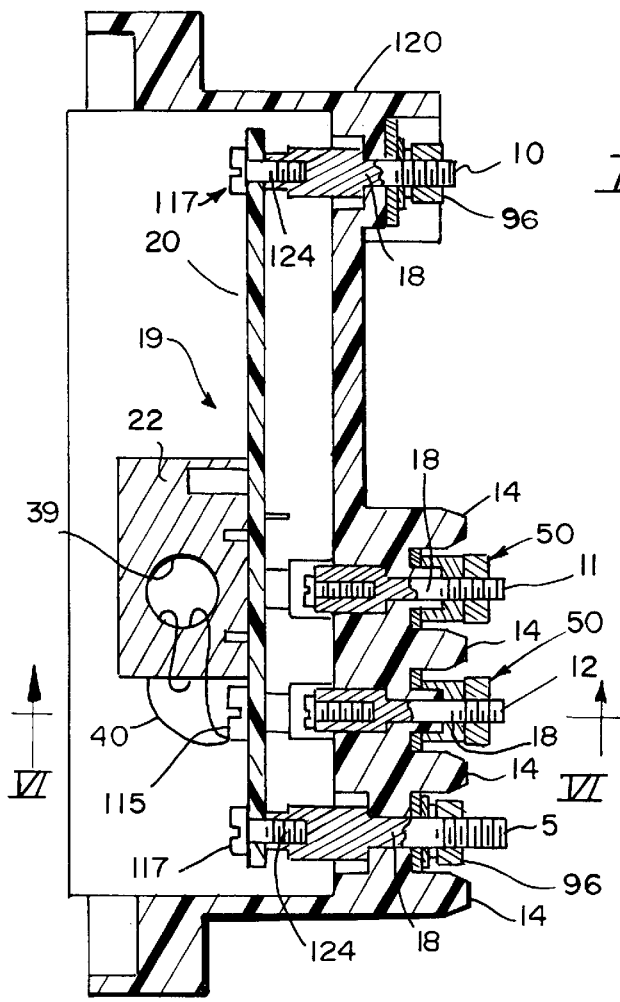
FIG. 2 is a side-view cut out of the integrated module, as seen from plane II—II.

FIGS. 1 and 2 depict an integrated identification module 13 comprising a housing 120 with a terminal block 14 on the housing 120. A plurality of stud terminals 1–12 extend through apertures 18 in the terminal blocks 14. For reasons that will become apparent later in this discussion, it is necessary to construct the terminal blocks 14 from a non-electrically conductive material, such as plastic. The housing and the terminal blocks could be formed from a monolithic, one piece structure, but need not be.

A plurality of stud terminals 1–12 extend through apertures 18 in the terminal block 14 such that a first end of each stud terminal 1–12 is outside the housing 120 and a second end of each stud terminal is inside the housing 120. As illustrated in FIG. 2, the second ends of a selected plurality of stud terminals will make contact with the circuit module 19.

The circuit module 19 includes a current sensor 22 in the housing as well as other portions of the ID module including a second communication node, shown in detail in FIG. 6.

At least two electrical leads 32, 34, comprise the power and communication trainline 38. The trainline 38 also comprises a shield 36 for the trainline leads 32,34. Input leads are denoted with the subscript I whereas output leads are denoted with the subscript O. Therefore, leads $32_I$, $34_I$, comprise the input of power and communication trainline 38, whereas $32_O$, $34_O$ comprise the output of power and communication trainline 38. A conductive strip connects the first ends of terminals 1 and 3, creating electrical connection between leads $32_I$, and $32_O$ when attached to terminals 1 and 3, respectively.

Each of the input electrical leads $32_I$, $34_I$, are connected to the first end of stud terminals 1, and 2, respectively, such that each input electrical lead $32_I$, $34_I$, from the train power line 38 is connected to its own stud terminal.

An equal number of electrical output leads $32_O$ $34_O$ comprising the output of power and communication trainline 38 is connected to the stud 3,4, respectively, such that each output electrical lead $32_O$, $34_O$ is connected to its own terminal.

In like manner, the shield input lead $36_I$, is connected to the first end of terminal 5, and the shield output lead $36_O$, is connected to the first end of terminal 6. A conductive strip 42 connects the first ends of terminals 5 and 6, creating an electrical connection between shield lines $36_I$ and $36_O$ when attached to the terminals 5 and 6 respectively. In order to provide a more effective shield for the trainline 38, at least one of the terminals 5,6 that receive the shield leads $36_I$, $36_O$ is connected to a ground 90.

As seen in FIG. 5, the terminal block 14 comprises first 1C, second 2C and third 3C channels wherein the apertures 18 for the terminals 1–4,11,12 are formed in each of the channels 1C,2C,3C. See, FIG. 5. The first ends of terminals 1,3, and 11 are spaced apart in the first channel 1C. A first conductive strip 41 lies in the first channel to electrically connect the first ends of terminals 1 and 3 and selectively to terminal 11.

The first ends of terminals 5 and 6 are spaced apart in the second channel 2C. A second conductive strip 42 lies in the second channel 2C to electrically connect the first ends of shield terminals 5 and 6.

As shown in FIG. 1, the first ends of terminals 2,4 and 12 are spaced apart in the third channel 3C. A third conductive 43 strip lies in the third channel 3C to electrically connect the first ends of terminals 2 and selectively to terminal 12. However, a dividing structure 47 is formed between terminals 12 and 4 to prevent the third conductive strip 43 from creating electrical contact between the first end of terminal 4 to the first end of terminals 12 and 2.

A conductive strip 41 connects the first ends of terminals 1, 11, and 3, thereby creating an electrical connection between lines $32_I$ and $32_O$ when the leads $32_I$, $32_O$ are fastened to the terminals 1 and 3 respectively. A conductive strip 43 connects the first ends of terminals 2 and 12. However, terminals 11 and 12 each bear a special connector cap 50 that enables one to selectively connect and disconnect the electrical connections between terminal 11 and terminal 1 and between terminal 12 and terminal 2. Consequently terminals 11 and 12 may be referred to hereinafter as switch terminals 11 and 12. The detail of this connector cap 50 will be described with respect to FIGS. 3 and 3A.

Figure 4:
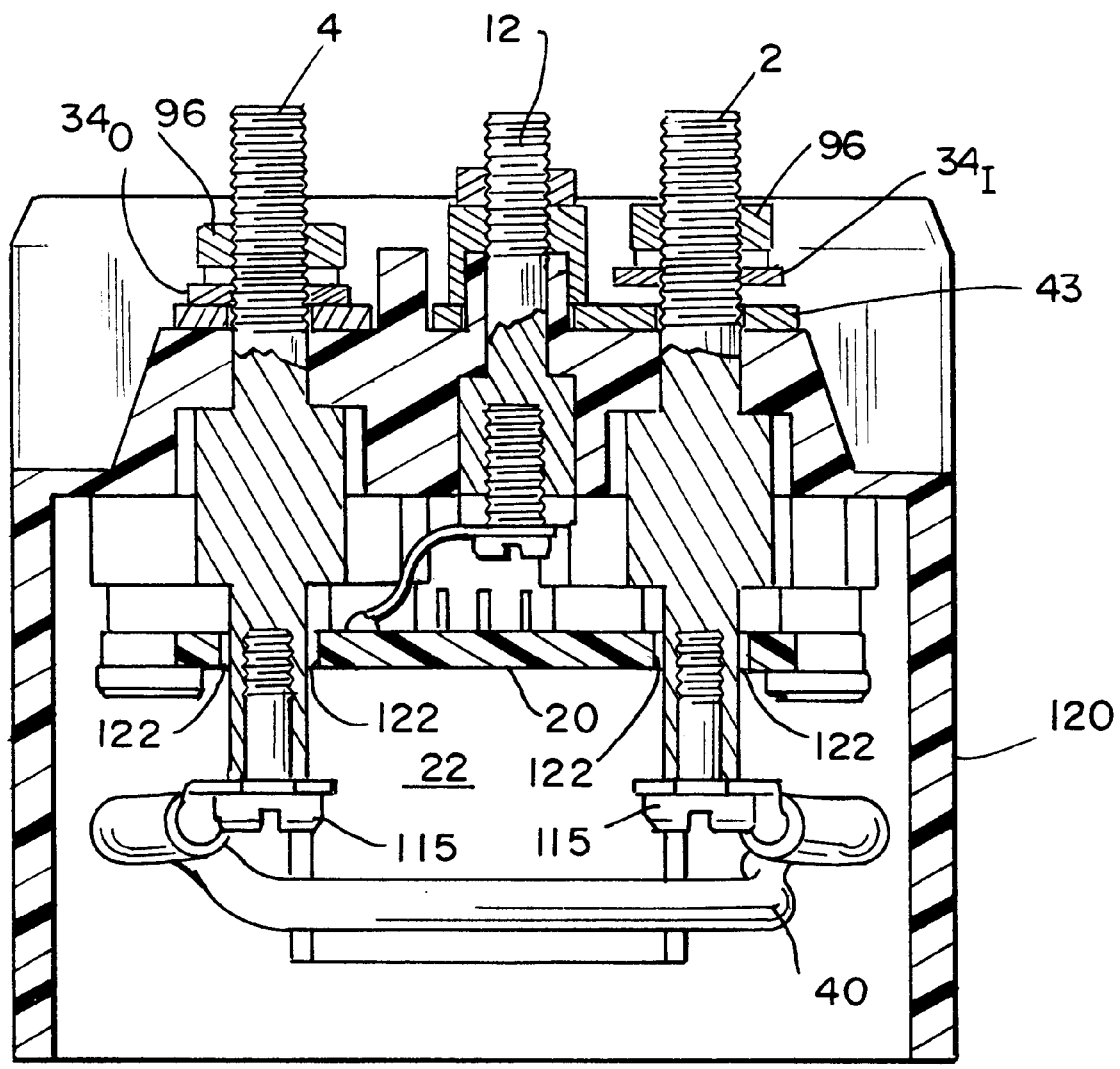
FIG. 4 is a close-up view of the interconnection of the circuit module and current sensor, as seen from plane IV—IV.

The dividing structure 47 prevents conductive strip 43 from extending to connect the first ends of terminals 2 and 4. Rather than being connected at the first ends by conductive strips, however, a jumper wire 40 passing through a hole 39 in current sensor 22 inside the housing interconnects the second ends of terminals 2 and 4, as shown in FIGS. 2 and 4. The jumper wires 40 forms the only connection between the train lines $34_I$ and $34_O$.

There are two distinct embodiments for attachment of the jumper wire to the second ends of terminals 2 and 4. One such embodiment is shown in FIG. 2. In this embodiment, the jumper wire 40 is electrically connected to the second end terminal 2 with a bolt 115. It is important to note that the circuit board 20 is configured such that the bolt 115 makes mechanical contact, but not electrical contact, with the circuit board 20. The jumper wire 40 passes through the hole 39 in the current sensor 22, preferably twice, then connects to a bolt 115 that is electrically connected to terminal 4 and mechanically contacts, but does not electrically contact, the circuit board 20. In this embodiment, however, extra caution should be exercised to make sure the bolt 115 cannot electrically contact any of the board's circuitry.

A second embodiment for the attachment of the jumper wire to the second end of the terminals 2 and 4 is depicted in FIG. 4. In this embodiment, the second end of terminals 2 and 4 extend through apertures 122 in the circuit board 20. Bolts 115 engage an internally threaded portion of the second end of each of the respective terminals to attach jumper wire 40. The apertures 122 in the circuit board 20 may be formed significantly large to prevent contact between the terminals 2 and 4 and the circuit board 20. This embodiment is used for making the ground connection from the second end of terminal 5 to the circuit board 20 via jumper wire 40.

Any open space inside the housing 120 is preferably filled by potting (not shown). The latter design for the jumper-wire terminals is preferred because the ID module may be exposed to extreme heat and cold as the train travels through various climates. Consequently, the materials will naturally expand and contract. In order to prevent material failure due to the strains and stresses of expansion, it is preferred to introduce apertures 122 that allow the board to move more freely as the board and potting material expands or contracts.

Regardless of which embodiment is chosen, it is important that the second end stud terminals 1–4 do not make electrical contact with the circuit board 20.

In contrast to terminals 1–4, the second ends of terminals 5–12 are electrically connected to the circuit board 20. As set forth above, the first ends of terminals 5 and 6 receive the input and output, respectively, of the trainline shield. The second ends at least one of the terminals 5 and 6 are electrically connected to the circuit board 20, preferably the ground 90 of the circuit module 19. As shown in FIG. 2, the second ends of terminals 11, 12 may be attached to the circuit board 20 by a pair of leads. Alternately, the second ends of terminals 11,12, may be attached to the circuit board 20 by bolts 117 extending through apertures 124, or by soldering 77.

The housing 120 further includes apertures 18 for seventh 7 and eighth 8 stud terminals, each having second ends connected to supply input ports of the circuit module 19. A pair of leads 27 connect the first ends of the seventh and eighth stud terminals to supply output ports of the car control device CCD.

The housing 120 further includes apertures 18 for ninth 9 and tenth 10 stud terminals, each having second ends connected to communication ports of the circuit module 19. Leads 28 connect the first ends of the ninth 9 and tenth 10 stud terminals to the car control device CCD.

Figure 2A:
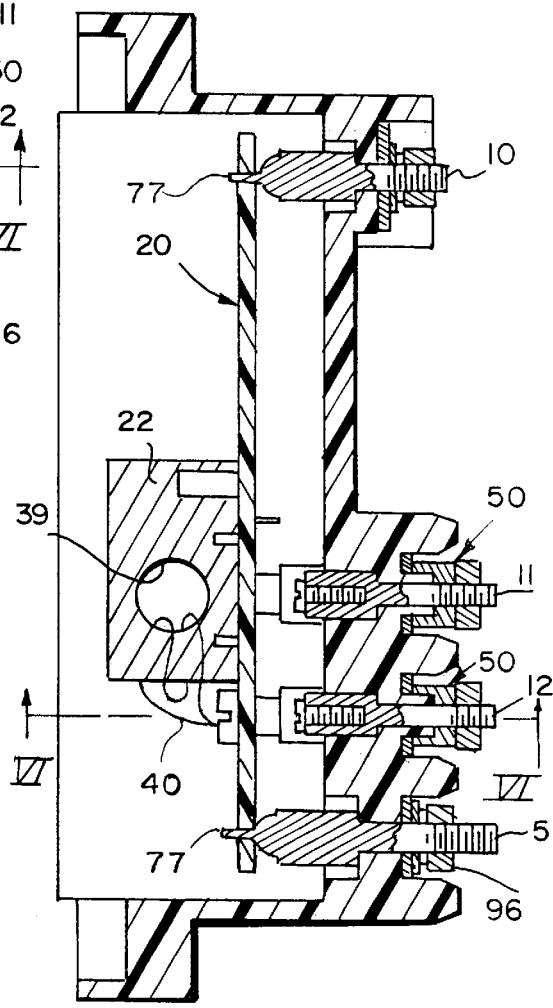
FIG. 2A is a side view cut out of the integrated module, as seen from plane II—II.

The second ends of terminals 7–10 are affixed to the circuit board by bolt 117 which extends through apertures 124 in the circuit board 20. The second ends of terminals 7–10 do not extend through the circuit board 20, but make make connection to the circuit board 20. Alternatively, the second ends of terminals 7–10 may be attached to the circuit board by soldering 77, as shown in FIG. 2A. Either of these configurations provides an effective electrical shield as well as firm support for the circuit board, which is suspended by the terminals in a spaced apart relation to the housing 120.

As aforementioned, there is a significant difference between bolts 115 and 117. Bolts 115 attach the circuit module to the second ends of respective terminals (i.e., terminals 1–4) in a place that will not create electrical contact between the circuit board 20 and the respective terminal; in contrast, bolts 117 fasten the circuit board 20 to the second ends of respective terminals (i.e., terminals 5–10) in such a way that will establish electrical contact with the circuit board 20.

As seen in FIG. 6, the second end of switch terminals 11, 12 electrically communicate to the circuit board 20 by means of an electrical lead 59 that connects the second end of the terminal to the circuit module 19. The circuit module 19 includes a load 156 and a switch 154 connected in series to second ends of eleventh 11 and twelfth 12 stud terminals. The second communication node 67 controls the switch 154 via neuron chip 60.

Typically, the second end of each switch terminal 11,12 is internally threaded to receive a bolt 63. Each lead 59 connects the second end of terminal 11,12 to the circuit board 20. The leads 59 are fastened at one end by the bolt 63 and at the other end by a solder joint 61. See, FIG. 3.

The first ends of each terminal 1–12 should be threaded to receive a cap or nut 96. The first ends of switch terminals 11,12, however, receive special connector caps 50, which is shown in detail in FIGS. 3 and 3A. The electrically conducting connector cap 50 has an engaging section 54 that threadedly engages the first end of each of the eleventh 11 and twelfth 12 terminals. The connector cap 50 also has an extending section 56 extending from the engaging section 54 toward the conducting strip 41, 42.

Figure 3:
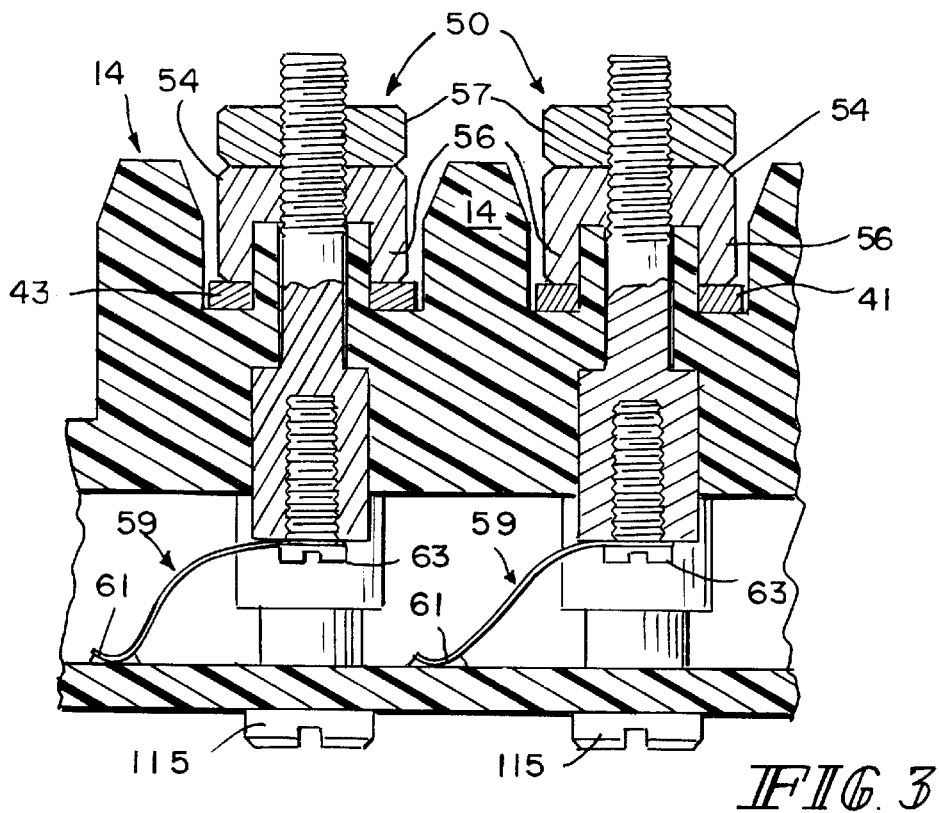
FIGS. 3 and 3A present close-up views of terminal caps in the closed and open positions, respectively, as viewed from plane III—III.
Figure 3A:
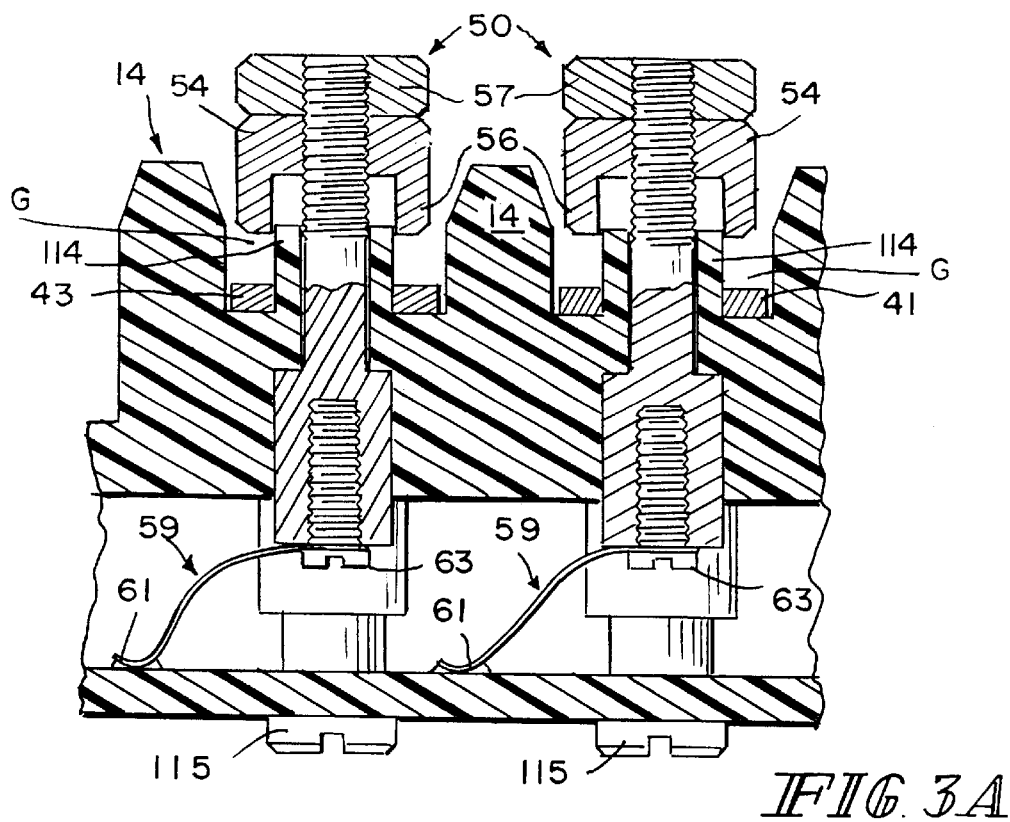

In particular, the connector cap 50 on the eleventh terminal is threadedly adjustable between a connected position, wherein the extending section 56 contacts the conducting strip 41, as shown in FIG. 3, and a disconnected position wherein the extending section 56 of the connector cap 50 does not make contact with the conducting strip 41, as shown in FIG. 3A.

Similarly, the connector cap 50 on the twelfth terminal 12 is threadedly adjustable between a connected position wherein the extending section 56 contacts conducting strip 42, and a disconnected position wherein the extending section 56 connector cap 50 does not make contact with the conducting strip 42. Although the connector caps 50 are shown as threaded onto the terminals, other adjustable interconnections can be used.

An extending ring 114 extends from the top face of the housing 120 to electrically isolate the conductive strips 41 and 42 from the conductive termninals 11 and 12. Although shown as an integral part of the housing 120, the extending ring may be a separate sleeve of insulative material.

FIGS. 3 depicts a close-up of the connecting caps 50 in the closed position. Note that an additional standard nut 57 may be turned onto the terminal in order to stabilize the connector cap 50 and prevent the connector cap from migrating due to vibration.

As a result, moving the connector cap 50 of terminal 11 to the closed position, as shown in FIG. 3, will create electrical connection of line $32_I$ to the circuit board 20. Analogously, closing the connector cap of terminal 12 will create electrical connection of the line $34_I$ to the circuit board 20.

In contrast, FIG. 3A shows connector caps 50 in the open position. The open position creates a gap G between the surface of the connecting strips 41,43 and the extending portion 56 of the connecting cap 50. Therefore, no current flows from the conducting strips 41,43 to the terminals 11,12 (and consequently to the circuit board 20) when the connector caps 50 are in the open position.

When the connector caps 50 are in the open position (as in FIG. 3A), current will flow directly from terminals $32_I$ and $34_I$ to $32_O$ and $34_O$, respectively. Opening the connector caps 50 allows one to isolate the electronics comprising the circuit module 19 so that the power and communication trainline 38 may be tested. The voltages necessary to perform tests on the trainline are very high when compared to the voltage tolerances of the electronics of the circuit module 19. Exposure to current at high voltages would likely cause serious damage to the circuit module 19, so it is necessary to isolate the circuit module 19 for testing.

The novel combination and configuration of the integrated ID module allows one to isolate the electronics for the test, then re-connect the system after the test is complete without the arduous task of dismantling and re-wiring the system. Rather, the system can be tested and re-connected with the easy turn of the connector cap 50.

A voltage source V, preferably a 12-Volt battery, is electrically connected by a first pair of electrical leads 26 directly to the car control device CCD. The CCD includes various electronics that will communicate with the circuit module 19. The configuration of the circuitry is set forth in FIG. 6.

FIG. 6 is an electrical diagram of the ID Module. The circuitry of the ID Module is very similar to the circuitry set forth in U.S. Pat. Nos. 6,012,681 and 5,966,084 issued to Lumbis et al. These two patents are incorporated into this disclosure by reference.

Note that terminals 1 and 2 receive trainline inputs $32_I$ and $34_I$, respectively, and terminals 5 and 6 comprise the shield. The shield is preferably connected to the ground 90 of the circuit module 19. The connection between terminals 1,11, and 3 is accomplished by means of a conducting strip. As discussed before, in the event connector caps 50 on switch terminals 11, 12 are left open, current will flow directly from the input to the output without ever entering the electronics on the circuit board 20. For illustration purposes, the electronics on the circuit module 19 are shown within a bound region.

Opening of the connector caps 50 on each of the switch terminals 11,12 prevents current from entering the circuit module 19 from the trainline 38; in short, backing off the connector caps 50 isolates the circuit module 19, from the trainline 38.

The circuit module 19 includes a voltage regulator 58 connected to terminals 7 and 8 by leads 27 to the supply output ports of the car control device CCD. The voltage regulator 58 is also in electric communication with the current sensor 22, the neuron chip or ID module 60, and a field effect transistor 62.

As seen in FIG. 6, the circuit module 19, and preferably the circuit board 20, also includes a pair of 470 uH Choke 64, each electrically connected directly to the second end of terminals 11,12. Current is directed from the Choke 64 to a full wave bridge 66, which is in series with a field effect transistor 154 and a load resistor 156.

A neuron chip or ID module 60 controls the field effect transistor 154 in response to signals from the car control device CCD at terminals 9 and 10 and leads 28 via transceiver 67. Optical couplers isolate the neuron chip or ID module 60 and related circuitry from the field effect transistor 154, load resistor 156, etc.

The Car Control Device CCD must be connected to both the circuit module 19 and the trainline 38. Thus, the CCD must be connected across the train lines 32,34. To accomplish this, a pair of electronic leads 29 extend from selected trainline terminals to the CCD. This may be done by attaching one lead 29 to the first end of either the first or second terminal 1 or 3. A second lead 29 is attached to the first end of either terminal 2 or 4. Each lead, of course, is then connected to the car control device CCD.

All told, a total of at least three pair of leads (total of six leads) extend from the integrated ID module to the CCD. As shown in FIG. 5, the leads 27,28,29 are formed into a cable 100 leading to a six-contact, military style plug 99. The plug 99 connects to a male receptacle 102; a wire harness 103 extends from receptacle 102 and leads to the CCD electronics. Thus, the CCD may be disconnected from the power and communication trainline 38 by removing the connection between plug 99 and receptacle 102. This allows disconnecting of the car control device CCD from the trainline during testing without removal of the leads from the terminal block.

The assembly of the integrated module is relatively simple and straightforward. First, conductive strips 41,42,43 are set into terminal blocks 14 on the housing 120. Then, the stud terminals 1–12 are installed into the housing. Leads 59 are attached at one end by solder joint 61 to the circuit board 20. Before installing the circuit board, the other ends of the leads 59 are attached to the second ends of switch terminals 11 and 12. Once the switch connections are made, a first face of the circuit board, preferably the face having circuitry printed thereon, is matched to the second ends of the selected termninals 5–10. These terminals are bolted to secure the circuit board to these terminals.

Preferably, terminals 2 and 4 will protrude through apertures 18 in the circuit board 20 such that the ends of terminals 2 and 4 are displaced from the second face of the circuit board 20. The current sensor 22 is mounted to the second face of the circuit board 20 in proximity to the second ends of terminals 2 and 4, such that a jumper wire 40 passing through the current sensor may interconnect terminals 2 and 4. The housing 120 is preferably mounted to a junction box 97 by bolts 98 that extend through apertures 107 on a perimeter of the housing 120.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a network for a train including at least one locomotive and a plurality of cars, each car being serially connected by a power and communication trainline to an adjacent car and having a local communication node connecting a car control device to the network, each car further including:
   a housing;
   a circuit module within the housing and including a second communication node and a current sensor;
   a terminal block on the housing;
   a plurality of stud terminals extending through apertures in the terminal block such that a first end of each stud terminal is outside the housing and a second end of each stud terminal is inside the housing, the second end of the plurality of stud terminals contacting the circuit module;
   at least two input leads, comprising an input from the power and communication trainline, being connected to the first end of first and second stud terminals, such that each input lead from the trainline is connected to its own stud terminal;
   a number of electrical output leads equal to the number of input leads, comprising an output to the power and communication trainline, being connected to the first end of third and fourth stud terminals, such that each output electrical lead to the trainline extends from the first end of its own stud terminal; and
   a jumper wire in the circuit module passing through the current sensor and interconnecting the second ends of the second and fourth terminals.

2. The network as in claim 1, wherein the first ends of the first and third stud terminals are connected by a first conductive strip.

3. The network as in claim 1, including a third input lead, comprising a shield input from the power and communication trainline, connected to the first end of a fifth stud terminal; a third output lead, comprising a shield output to the power and communication trainline, connected to the first end of a sixth stud terminal; and a second conductive strip connecting the first ends of the fifth and sixth stud terminals.

4. The network as in claim 3, wherein the second end of one of the fifth and sixth stud terminals is connected to the ground of the circuit module.

5. The network as in claim 1, including seventh and eighth stud terminals having second ends connected to supply input ports of the circuit module; and
   leads connecting the first ends of the seventh and eighth stud termninals to supply output ports of the car control device.

6. The network as in claim 5, including ninth and tenth stud terminals having second ends connected to communication ports of the circuit module; and
   leads connecting the first ends of the ninth and tenth stud terminals to the car control device.

7. The network as in claim 5, including at least two leads connecting trainline ports of the car control device to the first end of one of the first and second stud terminals and one of the third and fourth stud terminals.

8. The network as in claim 1, including ninth and tenth stud terminals, having second ends connected to supply input ports of the circuit module; and
   leads connecting the first ends of the ninth and tenth stud terminals to supply output ports of the car control device.

9. The network as in claim 1, including at least two leads connecting trainline ports of the car control device to the first end of one of the first and second stud terminals and one of the third and fourth stud terminals.

10. The network as in claim 1, including a load and a switch connected in series to second ends of eleventh and twelfth stud terminals; the first ends of the eleventh and twelfth stud terminals are connected to the first ends of one of the first and second stud terminals and one of the third and fourth stud terminals, respectively; and the second communication node controls the switch.

11. The network as in claim 1, wherein the housing is made from a non-conductive material.

12. The network as in claim 1, including eleventh and twelfth terminals each having a second end electrically connected to the circuit module;
   a first conducting strips extending from one of the first and second terminals toward the eleventh and twelfth terminal;

a second conducting strip extending from one of the third and fourth terminals toward the twelfth terminal;

and a connector cap positioned on each of the eleventh and twelfth terminals; wherein, each connector cap is selectively adjustable between a connected position electrically connecting the respective terminal and the respective conducting strip, and a disconnected position electrically disconnecting the respective terminal from the respective conducting strip.

13. The network as in claim 12, wherein the first ends of first, second, and eleventh terminals are spaced apart in a first channel; the first conductive strip lies in the first channel to electrically connect the first ends of the first and second terminals, and selectively to the eleventh terminal.

14. The network as in claim 13 wherein the first ends of fifth and sixth terminals are spaced apart in a second channel; the second conductive strip lies in the second channel to electrically connect the first ends of the fifth and sixth terminals.

15. The network as in claim 12, wherein the first ends of third, twelfth, and fourth terminals are spaced apart in a third channel; a third conductive strip lies in the third channel to selectively electrically connect the first ends of the third and twelfth terminals.

16. The network as in claim 15, wherein a dividing structure lies in the third channel between the twelfth and fourth terminals, the dividing structure preventing the third conductive strip from creating electrical contact between the first ends of the fourth and twelfth terminals.

17. The network as in claim 1, wherein the circuit module includes electronics mounted to a circuit board displaced from the housing and mounted to the second ends of the plurality of the stud terminals, thereby forming a space between the circuit board and the housing.

18. The network as in claim 17, wherein the circuit module and the space between the circuit board and the housing is potted.

19. The network as in claim 17, wherein the current sensor is mounted to the circuit board.

20. The network as in claim 1 including leads connecting the stud terminals to the car control device are combined into a cable and the cable includes a disconnect for the car control device, the disconnect positioned between ends of the cable.

21. The network as in claim 1, wherein the terminal block comprises first, second and third channels wherein the apertures for the terminals are formed in each of the channels.

22. The network as in claim 17, wherein the plurality of stud terminals comprises fifth, sixth, seventh, eighth, ninth, and tenth stud terminals; and, the second ends of fifth through tenth terminals are electrically affixed to the circuit board.

23. The network as in claim 22 wherein the second ends of the fifth through tenth stud terminals are each secured to the circuit board by bolts extending through apertures in the circuit module, the bolts are threadedly received by the second end of the stud terminals.

24. The network as in claim 22, wherein the second ends of the fifth through tenth stud terminals are affixed to the circuit board by soldering.

25. The network as in claim 17 wherein the second ends of eleventh and twelfth terminals are spaced from and electrically connected to the circuit board by an electrical lead extending from the circuit board to the second end of the respective terminal.

26. The network as in claim 1, wherein the second ends of the first, second, third and fourth terminals do not make electrical contact with the circuit module.

27. The network as in claim 26, further comprising apertures formed in the circuit board, wherein the second ends of the second and fourth terminals extend through the apertures and past a plane defined by the circuit board.

28. The network as in claim 27, wherein the apertures are sufficiently large to allow the second end of the second and fourth terminals to pass through the circuit module without contacting the circuit module.

29. The network as in claim 12, wherein each connector cap includes an engaging section that threadedly contacts the first end of a respective stud terminal, and an extending section extending toward the conductive strip.

30. The network as in claim 29, further comprising extruding rims extending from a face of the housing to encircle each first end of each respective stud terminal to thereby provide a nonconductive barrier between the terminal and the extending section of the connector cap and the conductive strip.

* * * * *